US010862302B1

(12) United States Patent
Eyford, III et al.

(10) Patent No.: US 10,862,302 B1
(45) Date of Patent: Dec. 8, 2020

(54) INTELLIGENT DATA PREPROCESSING TECHNIQUE TO FACILITATE LOADSHAPE FORECASTING FOR A UTILITY SYSTEM

(71) Applicant: Oracle International Corporation, Redwood Shores, CA (US)

(72) Inventors: Cornell Thomas Eyford, III, Ridgefield, WA (US); Kenny C. Gross, Escondido, CA (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/458,498

(22) Filed: Jul. 1, 2019

(51) Int. Cl.
*H02J 3/06* (2006.01)
*G06Q 30/02* (2012.01)
*G06Q 10/06* (2012.01)
*G06Q 50/06* (2012.01)
*H02J 3/00* (2006.01)

(52) U.S. Cl.
CPC .......... *H02J 3/06* (2013.01); *G06Q 10/06315* (2013.01); *G06Q 30/0206* (2013.01); *G06Q 50/06* (2013.01); *H02J 3/003* (2020.01)

(58) Field of Classification Search
CPC ...... H02J 3/06; H02J 3/003; G06Q 10/06315; G06Q 30/0206; G06Q 50/06
See application file for complete search history.

(56) References Cited

U.S. PATENT DOCUMENTS

| 7,058,522 | B2 | 6/2006 | Chen |
| 7,246,014 | B2 | 7/2007 | Forth et al. |
| 2013/0096983 | A1* | 4/2013 | Forbes ............... G06Q 10/04 705/7.31 |

(Continued)

FOREIGN PATENT DOCUMENTS

WO    2018098575 A1    6/2018

OTHER PUBLICATIONS

Ding, Yong et al., "A Framework for Short-Tem Activity Aware Load Forecasting", http://www.teco.edu/~ding/publications/STLF_Framework.pdf, downloaded Jul. 21, 2020.

(Continued)

*Primary Examiner* — Ziaul Karim
(74) *Attorney, Agent, or Firm* — Park, Vaughan, Fleming & Dowler LLP

(57) ABSTRACT

The system receives a set of load signals from an archive that contains historic load information gathered at various locations throughout an electrical grid, which distributes electrical power for the utility system. Next, the system applies a first difference function to the set of load signals to produce a set of difference signals. The system then performs a spike-detection operation on the set of difference signals to identify pairs of positive-negative and negative-positive spikes, which identify gaps in the set of load signals associated with periods of network disruption. Next, the system modifies the set of load signals by filling in each identified gap with projected load values determined by performing a localized loadshape forecasting operation (Continued)

based on the continuous load values immediately preceding the identified gap. Finally, the system forecasts electricity demand for the utility system based on the modified set of load signals.

20 Claims, 8 Drawing Sheets

(56) References Cited

U.S. PATENT DOCUMENTS

| | | | |
|---|---|---|---|
| 2014/0156322 A1* | 6/2014 | Monforte | G06Q 50/06 705/7.11 |
| 2015/0120224 A1* | 4/2015 | Siebel | G06F 16/258 702/61 |
| 2015/0161233 A1 | 6/2015 | Flora et al. | |
| 2019/0094822 A1 | 3/2019 | Gross et al. | |
| 2019/0165580 A1* | 5/2019 | Doherty | H02J 3/32 |
| 2019/0312457 A1* | 10/2019 | Li | G06N 3/02 |

OTHER PUBLICATIONS

Powering 2016—"The Digital Transformation of Electricity", https://www.ge.com/digital/sites/default/files/download_assets/Power%20Digital%20Solutions%20Product%20Catalog.pdf, downloaded Jul. 21, 2020.

Abogaleela, Mohamed et al., "Optimal Scheme with Load Forecasting for Demand Side Management (DSM) in Residential Areas", Energy and Power Engineering, Jul. 2013.

Meisenbach, Chr., "Intelligent Energy Management of Electrical Power Systems With Distributed Feeding on the Basis of Forecasts of Demand and Generation", http://www.cired.net/publications/cired2001/4_31.pdf, downloaded Jul. 21, 2020.

Murto, Pauli, "Neural Network Models for Short-Term Load Forecasting", Helsinki University of Technology, Dept of Engineering Physics and Mathematics, Jan. 5, 1998.

International Search Report and Written Opinion from the European Patent Office for PCT Patent Application No. PCT/US2020/031474 dated Jul. 2, 2020.

* cited by examiner

INTELLIGENT DATA PREPROCESSING TECHNIQUE TO FACILITATE LOADSHAPE FORECASTING FOR A UTILITY SYSTEM

BACKGROUND

Field

The disclosed embodiments generally relate to techniques for performing electricity demand forecasting to further the ongoing operations of a utility system. More specifically, the disclosed embodiments relate to an intelligent load data preprocessing technique that facilitates improved electric loadshape forecasting for a utility system.

Related Art

Electric utility systems typically provide very limited storage for electricity, which means that supply and demand have to be continuously matched. When demand suddenly exceeds supply, regional blackouts can occur. To avoid such blackouts, utilities buy and sell electricity continuously via regional and national grids. Accurate loadshape forecasting to predict demand two or more hours into the future is essential, because real-time spot-market rates for buying and selling electricity on the grid can vary by a factor of 10 to 20. For this reason, most utility systems are beginning to use machine-learning techniques that analyze information from multi-year data historian archives and long-term historical weather patterns, to create short-term loadshape forecasts based on the present and near-term predicted weather conditions. These short-term forecasts make it possible to optimize supply and demand decisions to minimize the cost of spot-market purchases, and maximize revenue from spot-market sales, on an hourly basis.

Utility systems are also interested in long-term loadshape forecasts to project demand weeks and months into the future, where the demand is less influenced by hourly or daily weather fluctuations, but is more influenced by projected population growth (or decline) patterns, seasonal weather patterns and residential/business demand growth patterns across geographical regions served by the utility. Such long-term demand forecasts are used by electrical utilities to perform important operations, such as: demand-side management; storage maintenance and scheduling; integration of renewable energy sources; coordinating the availability of cheaper power through alternative means, such as energy exchanges; and creating bilateral electricity supply agreements with neighboring utilities and cogeneration facilities.

The accuracy of both short-term and long-term forecasts is strongly influenced by the fidelity of archived signals in data historian archives. However, the fidelity of such archived signals is often adversely affected by network disruption events, such as transformer failures or scheduled maintenance. The archived data produced during such network disruption events is not consistent with the normal operation of the utility system and can lead to significant inaccuracies in both short-term and long-term demand forecasts.

Hence, what is needed is a technique for mitigating the adverse effects of anomalous perturbations to archived data historian signals produced during such network disruption events.

SUMMARY

The disclosed embodiments relate to a system that forecasts electricity demand for a utility system. During operation, the system first receives a set of load signals from an archive that contains historic load information gathered at various locations throughout an electrical grid, which distributes electrical power for the utility system. Next, the system preprocesses the set of load signals. During this preprocessing operation, the system applies a first difference function to the set of load signals to produce a set of difference signals. The system then performs a spike-detection operation on the set of difference signals to identify pairs of positive-negative and negative-positive spikes, which identify gaps in the set of load signals associated with periods of network disruption. Next, the system modifies the set of load signals by filling in each identified gap with projected load values determined by performing a localized loadshape forecasting operation based on the continuous load values immediately preceding the identified gap. After the preprocessing operation is complete, the system forecasts electricity demand for the utility system based on the preprocessed set of load signals.

In some embodiments, the system uses the forecast for the electricity demand to control a supply of electricity provided by the utility system.

In some embodiments, controlling the supply of electricity provided by the utility system comprises one or more of the following: controlling an amount of electricity produced by one or more power plants in the utility system; purchasing electricity for the utility system through a power grid; selling electricity produced by the utility system through the power grid; storing electricity for future use by the utility system; and making plans to construct a new power plant or adding other generating assets (e.g. wind turbines, gas-fired turbines, solar farms, or geo-thermal assets) for the utility system.

In some embodiments, while forecasting the electricity demand for the utility system, the system uses a set of input signals, which includes the set of load signals and other input signals, to train an inferential model that learns correlations among the set of input signals. Next, the system uses the inferential model to produce a set of inferential signals, wherein the inferential model produces an inferential signal for each input signal in the set of input signals. The system then uses a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals. Finally, the system projects the set of synthesized signals into the future to produce a forecast for the electricity demand for the utility system.

In some embodiments, the inferential model is trained using a Multivariate State Estimation Technique (MSET).

In some embodiments, while using the Fourier-based decomposition-and-reconstruction technique to generate the set of synthesized signals, the system uses a telemetry parameter synthesis (TPSS) technique, which creates a high-fidelity synthesis equation that is used to generate the set of synthesized signals.

In some embodiments, while generating the set of synthesized signals, the system first generates a set of un-normalized signals. The system then performs an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

In some embodiments, the other input signals include electrical usage data from a set of smart meters, wherein each smart meter in the set gathers electrical usage data from residential and business customers of the utility system.

In some embodiments, while replacing the load values in the identified gaps with the projected load values, the system uses an optimal-value imputation technique, which replaces missing load values in the set of load signals with imputed load values determined based on correlations between the load signals.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Figure 1A:
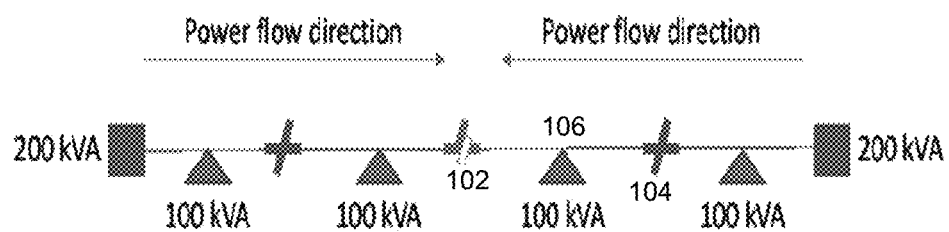
FIG. 1A illustrates an exemplary grid circuit, which includes a left circuit and a right circuit, in accordance with the disclosed embodiments.
Figure 1B:
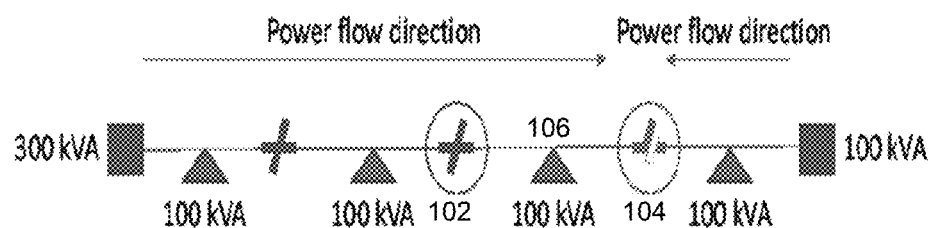
FIG. 1B illustrates the same grid circuit, wherein a transformer is moved from the right circuit to the left circuit, in accordance with the disclosed embodiments.
Figure 2A:
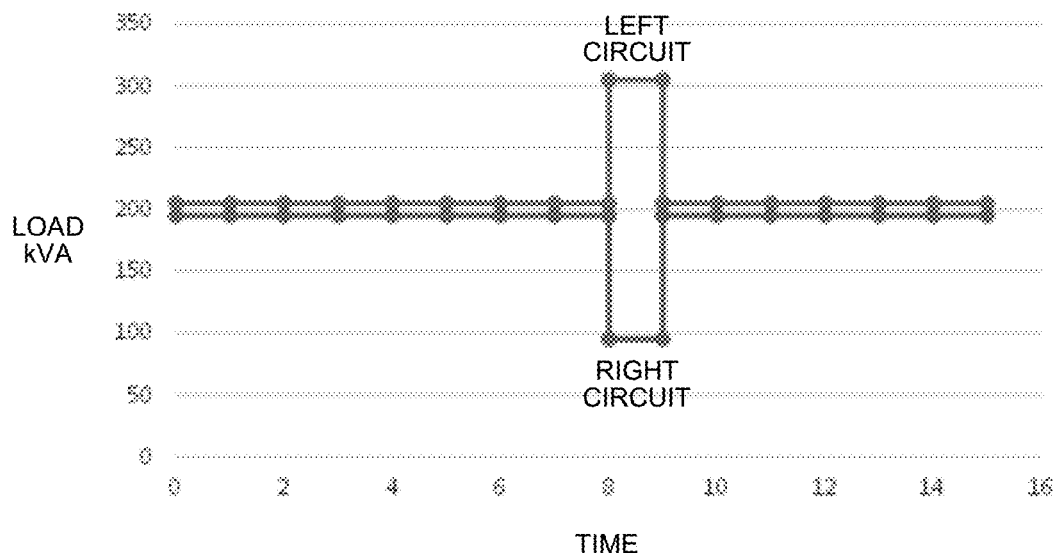
FIG. 2A presents a graph illustrating the load pattern for the load transfer case in accordance with the disclosed embodiments.

To understand the ways in which electrical load can be disrupted, we first examine two common scenarios. Consider FIG. 1A, wherein two circuits that originate from the left and right sides of the figure share a common tie switch 102. Both of these circuits normally carry 200 kVA of load. Now assume that the closed mid-point switch 104 in the right circuit needs to be maintained, so transformer 106 is transferred from the right circuit to the left circuit by closing tie switch 102 and opening tie switch 104 as is illustrated in FIG. 1B. At this point, the left circuit is carrying 300 kVA, while the right circuit is carrying only 100 kVA. Moreover, everything is operating properly, and there are no outages. However, the two circled switches 102 and 104 are in abnormal states (not "invalid states," but rather "not in a normal configuration"), which causes the loading levels of both circuits to be invalid for load forecasting purposes. The left circuit does not see a permanent 50% load increase, nor should we project this load increase into the future. Similarly, the left circuit did not see half of its load permanently disappear; it was temporarily moved to another circuit, and will likely be moved back in a day or two. The corresponding load pattern for the load transfer case for both the left and right circuits is illustrated in FIG. 2A. Because we really only want to use "steady state" loading to determine growth rates and other changes, we want to be able to autonomously screen out these anomalies.

Figure 1C:
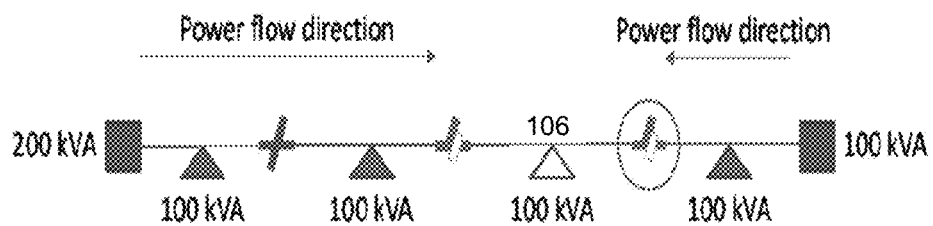
FIG. 1C illustrates the same grid circuit, which has an isolated fault near a transformer, in accordance with the disclosed embodiments.
Figure 2B:
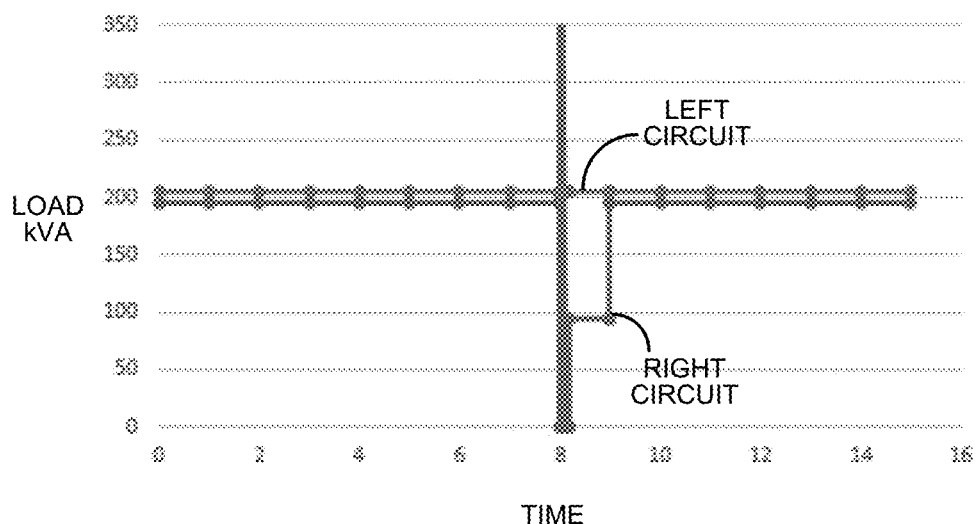
FIG. 2B presents a graph illustrating the load pattern for the outage case in accordance with the disclosed embodiments.

Something similar happens during the power outage case as is illustrated in FIG. 1C. In this case, an isolated fault exists near transformer 106, which is no longer receiving power. The left circuit is operating normally, but the right circuit is serving only 100 kVA of load while the outage is being restored. The corresponding load pattern for this power outage case for both the left and right circuits is illustrated in FIG. 2B. Note that for the power outage case, there may be some noise in the load signals, depending upon what gets picked up by the data historian. For example, there may be a large spike of current indicating the presence of a short circuit, which would be interrupted by the circuit breaker, which causes the current to temporarily drop to zero. However, the spike may not last long enough for the utility's analog System Control And Data Acquisition (SCADA) system to pick it up. So the circuit usually remains tripped offline for several seconds after interrupting a fault to allow the arc to extinguish, which means there will be at least a few intervals of zero current seen by the sensor. Once the fault is located and the first sectionalizing switch is open, the first half of the circuit can be restored quickly, with the remainder brought back online after the fault is repaired. Again, the circuit did not experience a "real" drop in load from a forecasting point of view; it is only temporarily missing load values due to the power outage.

For each of the above-described scenarios, we want to identify where these anomalies occur in the data historian database so we can "analytically de-tune" the anomalous patterns from the database before initiating the training process for short-term and long-term loadshape forecasting. During this forecasting process, we want to calculate underlying long-term trends, but these usually result in changes of only a few percent or less over the course of a year, while short-term anomalies can be orders of magnitude larger and can easily obscure the long-term trends.

Although the above examples have provided simple illustrations of the two data-cleansing scenarios with simple straight-line graphs, in fact actual data-historian time-series graphs are very dynamic, with diurnal (night-to-day) load variations of 30% in most large cities. These diurnal load variations are then superimposed on longer-term seasonal variations (coldest winter day to hottest summer day) of an additional 80% in the hottest and coldest regions of the country. Consequently, an automated anomaly discovery process to facilitate preprocessing of training data for loadshape forecasting does not work effectively by merely setting a threshold and then inferring network anomalies when loads cross the threshold. What is needed is an advanced statistical pattern-recognition-based technique to efficiently detect what we call "box irregularities," meaning square wave deviations up or down, which are superimposed on the complex dynamic loadshape patterns.

Our new technique for intelligent autonomous preprocessing sifts through long-term data historian signals and identifies these box irregularities in otherwise steady state time-series signals. Our new technique begins by calculating the first difference function for each signal in the data historian, wherein the first difference function is a numerical approximation to the first derivative of a time-series signal. Note that the first difference function highlights all plateau regions regardless of their magnitudes. Then, by putting a simple criterion on spikes in the first difference function, we can identify and characterize "square wave" deviations. For example, a rectangle up in a load signal will comprise a positive spike followed by a negative spike in the first difference function, and a rectangle down in a load signal will comprise a negative spike followed by a positive spike in the first difference function.

Note that we use a "spike-detection" technique to detect such positive and negative spikes. (For example, see the spike-detection technique described in U.S. patent application Ser. No. 16/215,345, entitled "Synthesizing High-Fidelity Signals with Spikes for Prognostic-Surveillance Applications" by inventors Guang C. Wang and Kenny C. Gross, filed 10 Dec. 2018, which is hereby incorporated herein by reference.) This spike-detection technique is applied to the first difference function to detect positive-negative and negative-positive spike pairs, which makes it possible to filter out the box irregularities from the data-historian signals to facilitate short-term and long-term loadshape forecasting.

After all box irregularities have been identified in the data historian signals, instead of just cutting out and discarding those box irregularities, we fill in the gaps created by the box irregularities with load values that are inferred from preceding load values. For each box irregularity, we first (1) extract the longest possible segment of "normal" data that occurred before the box irregularity. (2) We then use the extracted segment to train a "miniature projection model" for a loadshape forecasting technique. (For example, see the loadshape forecasting model described in U.S. patent application Ser. No. 15/715,692, entitled "Electric Loadshape Forecasting Based on Smartmeter Signals" by inventors Kenny C. Gross, Mengying Li and Guang C. Wang, filed 26 Sep. 2017, which is hereby incorporated herein by reference.) (3) Finally, we use this miniature projection model to project load values through the box irregularity time span.

For example, if a network experiences no irregularities for 18 months, and then experiences an outage that takes two weeks to repair, there will be a two-week box irregularity in the data streams in the data historian archives. In this case, we use load values from the 18 contiguous months prior to the network outage to project load values through the two-week outage period. This is superior to simply discarding the data in the box irregularity to produce training data for loadshape forecasting. After all gaps in load data associated with box irregularities have filled in with inferred load values, we train the loadshape forecasting model to project electrical load into the future.

Before describing our preprocessing technique further, we first describe a utility system in which it operates.

Exemplary Utility System

Figure 3:
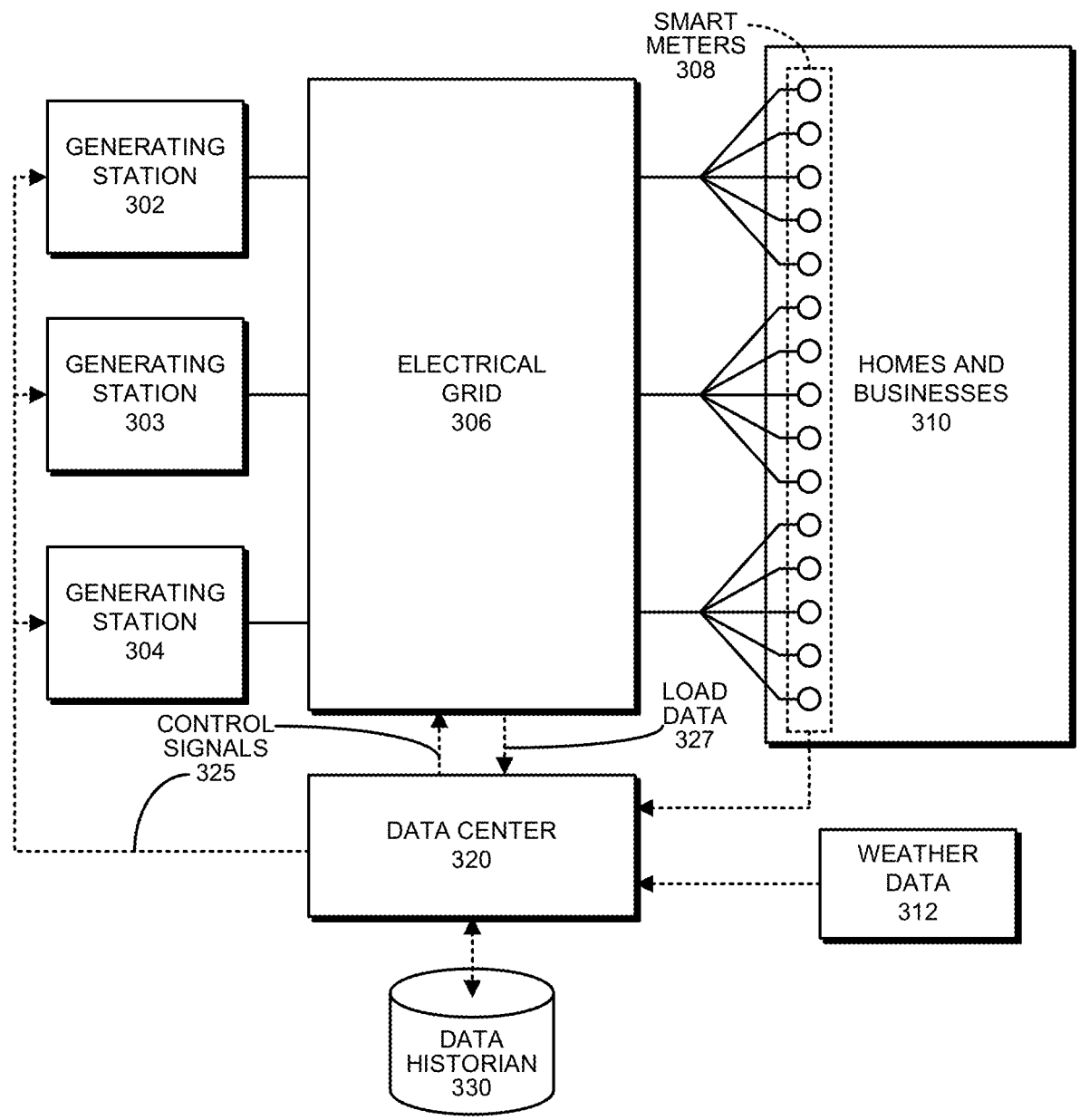
FIG. 3 illustrates an electrical utility system comprising a set of generating stations connected to homes and businesses through an electrical grid in accordance with the disclosed embodiments.

FIG. 3 illustrates an exemplary utility system comprising a set of generating stations 302-304 connected to homes and businesses 310 through an electrical grid 306 in accordance with the disclosed embodiments. Note that generating stations 302-304 can generally include any type of facility that generates electricity, such as a nuclear power plant, a solar power plant, a windmill or a windmill farm, or a coal-fired, natural gas or oil-burning power plant. Generating stations 302-304 connect into electrical grid 306, which transfers electricity to homes and businesses 310 within a region served by utility system 300, and also transfers electricity to and from other utility systems. Note that electrical grid 306 transfers electricity to homes and businesses 310 through individual smart meters 308, which periodically transmit AMI signals containing electrical usage data, including kilowatt measurements and kilowatt-hour measurements, to a data center 320.

A control system within datacenter 320 receives the AMI signals from smart meters 308 along with weather data 312, comprising historic, current and forecasted weather information, and produces a load forecast, which is used to send control signals 325 to generating stations 302-304 and to electrical grid 306. During operation of this system, load data 327 from electrical grid 306 is received by data center 320 and is stored in data historian archive 330. This load data is subsequently used to optimize the load forecast as is described in more detail below.

Generating a Loadshape Forecast

Figure 4:
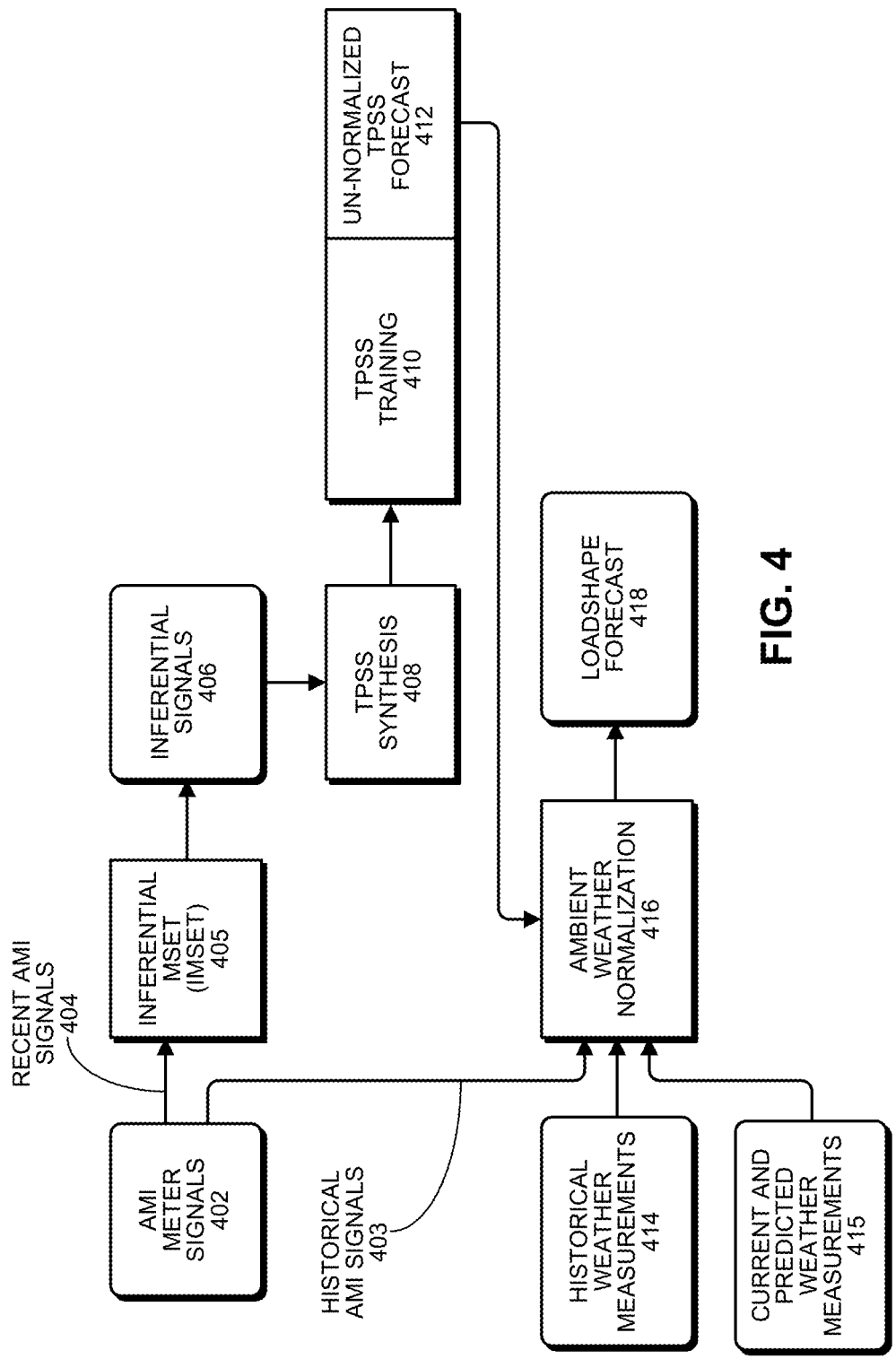
FIG. 4 presents a flow diagram illustrating how a load-shape forecast is computed in accordance with the disclosed embodiments.

FIG. 4 presents a flow diagram illustrating how the above-described system computes optimal loadshape forecast 418 in accordance with the disclosed embodiments. The system starts with AMI meter signals 402 obtained from numerous smart meters in a utility system. As illustrated in FIG. 4, these AMI meter signals 402 comprise both historical AMI signals 403 and recent AMI signals 404. The system feeds recent AMI signals 404 into an inferential MSET module 405, which trains an inferential model to learn correlations among the recent AMI signals 404, and then uses the trained inferential model to produce a set of inferential signals 406. Next, the system feeds the inferential signals 406 into a TPSS synthesis module 408 that performs a TPSS training operation 410, which decomposes each signal in the set of inferential signals 406 into deterministic and stochastic components, and then uses the deterministic and stochastic components to generate a corresponding set of synthesized signals, which are statistically indistinguishable from the inferential signals. Finally, the system projects the set of synthesized signals into the future to produce an un-normalized TPSS forecast 412 for the electricity demand for the set of utility customers.

Next, the system feeds the un-normalized TPSS forecast 412 into an ambient weather normalization module 416, which normalizes the un-normalized TPSS forecast 412 to account for variations in electricity usage caused by predicted changes in ambient weather. This normalization process involves analyzing historical AMI signals 403 with respect to historical weather measurements 414 to determine how AMI meter signals 402 change for different weather patterns. The normalization process then uses current and predicted weather measurements 415 to modify the un-normalized TPSS forecast 412 to account for the predicted weather conditions. This produces a final loadshape forecast 418, which can be used by the utility system to perform various operations as mentioned above to control a supply of electricity provided by the utility system.

Forecasting Electricity Demand

Figure 5:
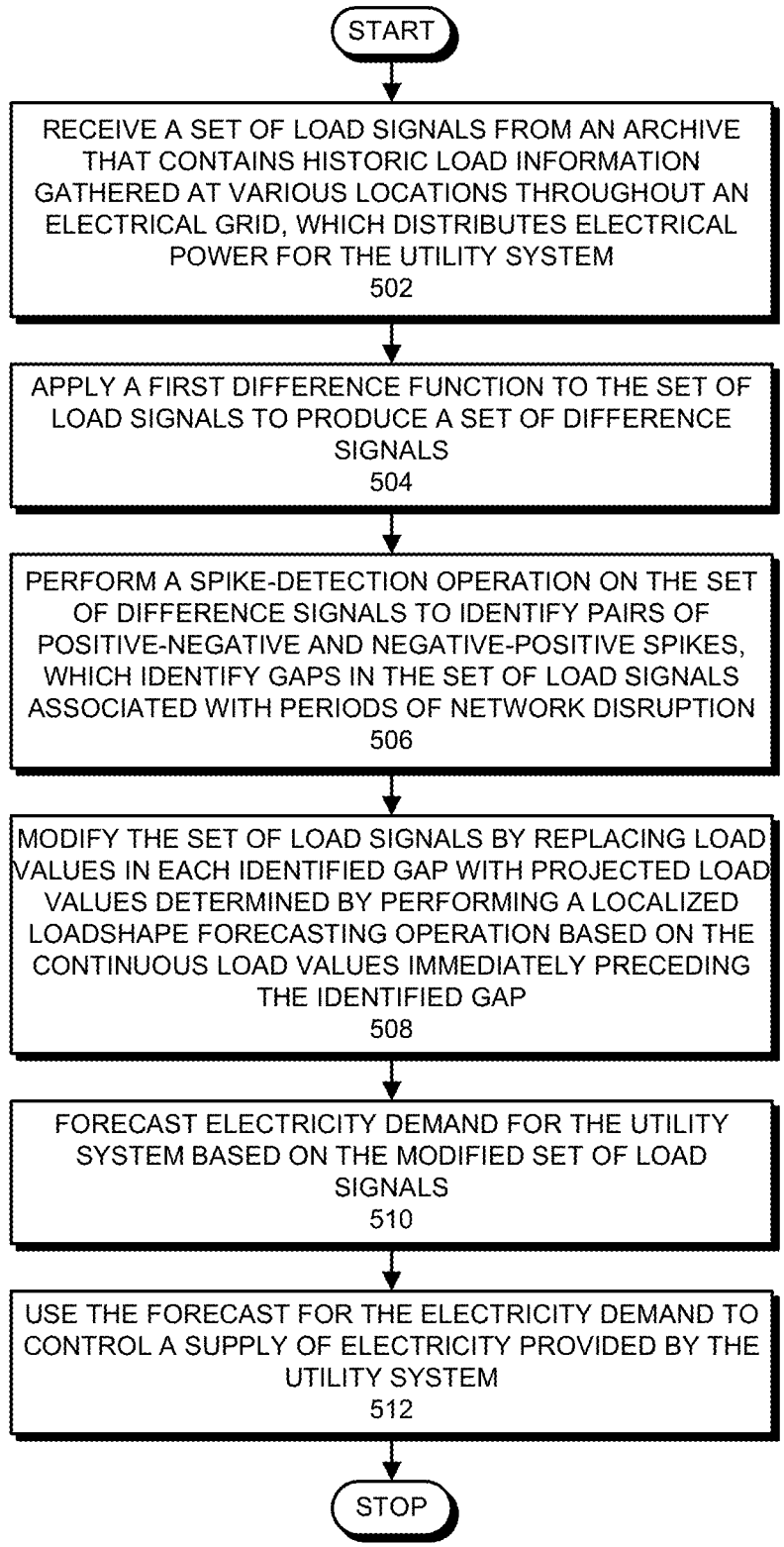
FIG. 5 presents a flowchart for a technique that preprocesses load data, and then uses the preprocessed load data to forecast electricity demand in accordance with the disclosed embodiments.
Figure 6:
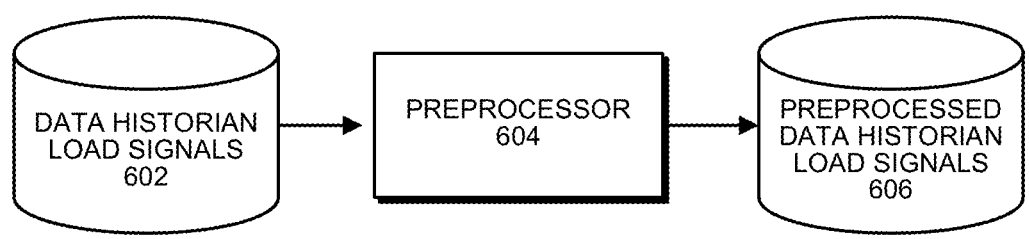
FIG. 6 presents a diagram illustrating a preprocessor in accordance with the disclosed embodiments.

FIG. 5 presents a flowchart for a technique that preprocesses load data, and then uses the preprocessed load data to forecast electricity demand in accordance with the disclosed embodiments. The system first receives a set of load signals from an archive that contains historic load information gathered at various locations throughout an electrical grid, which distributes electrical power for the utility system (step 502). Next, the system applies a first difference function to the set of load signals to produce a set of difference signals (step 504). The system then performs a spike-detection operation on the set of difference signals to identify pairs of positive-negative and negative-positive spikes, which identify gaps in the set of load signals associated with periods of network disruption (step 506). Next, the system modifies the set of load signals by filling in each identified gap with projected load values determined by performing a localized loadshape forecasting operation based on the continuous load values immediately preceding the identified gap (step 508). The system then forecasts electricity demand for the utility system based on the modified set of load signals (step 510). Finally, the system uses the forecast for the electricity demand to control a supply of electricity provided by the utility system (step 512). Note that steps 504, 506 and 508 are performed by a preprocessor 604 as is illustrated in FIG. 6, which preprocesses data historian load signals 602 to produce preprocessed data historian load signals 606.

Figure 7:
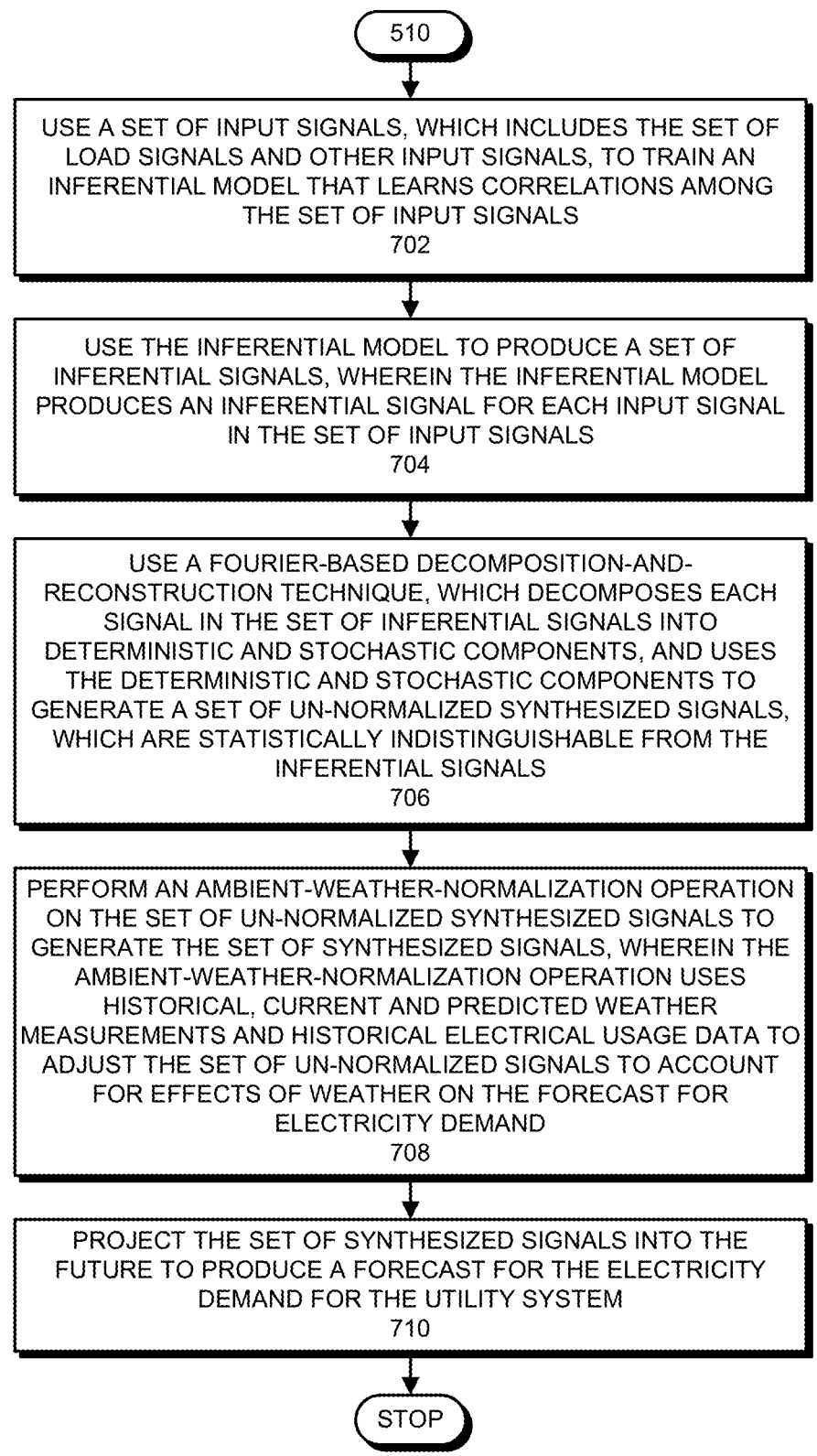
FIG. 7 presents a flowchart illustrating a process for forecasting electricity demand in accordance with the disclosed embodiments.

FIG. 7 presents a flowchart illustrating a process for forecasting electricity demand in accordance with the disclosed embodiments. (This flowchart illustrates in more detail the operations performed in step 510 of the flowchart in FIG. 5.) First, the system uses a set of input signals, which includes the set of load signals and other input signals, to train an inferential model that learns correlations among the set of input signals (step 702). Next, the system uses the inferential model to produce a set of inferential signals, wherein the inferential model produces an inferential signal for each input signal in the set of input signals (step 704). The system then uses a Fourier-based decomposition-and-reconstruction technique, which decomposes each signal in the set of inferential signals into deterministic and stochastic components, and uses the deterministic and stochastic components to generate a set of un-normalized synthesized signals, which are statistically indistinguishable from the inferential signals (step 706). Next, the system performs an ambient-weather-normalization operation on the set of un-normalized synthesized signals to generate the set of synthesized signals, wherein the ambient-weather-normalization operation uses historical, current and predicted weather measurements and historical electrical usage data to adjust the set of un-normalized signals to account for effects of weather on the forecast for electricity demand (step 708). Finally, the system projects the set of synthesized signals into the future to produce a forecast for the electricity demand for the utility system (step 710).

Figure 8:
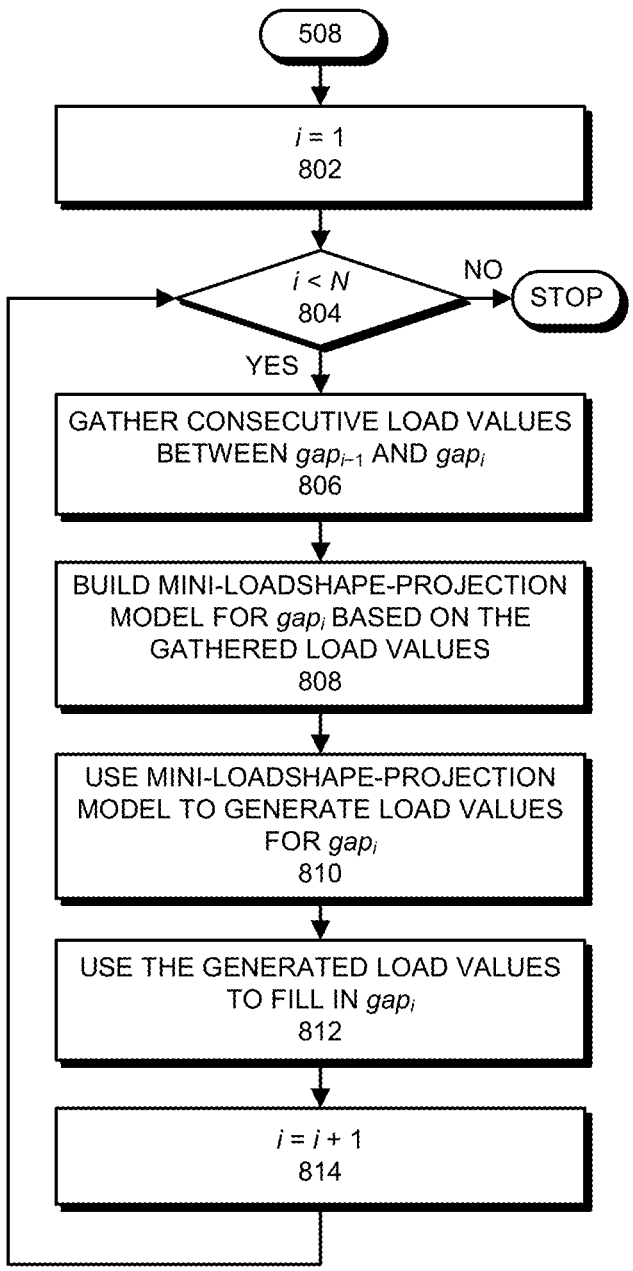
FIG. 8 presents a flowchart illustrating a process for replacing load values in gaps, which are associated with periods of network disruption, with projected load values in accordance with the disclosed embodiments.

FIG. 8 presents a flowchart illustrating a process for replacing load values in gaps, which are associated with periods of network disruption, with projected load values in accordance with the disclosed embodiments. (This flowchart illustrates in more detail the operations performed in step 508 of the flowchart in FIG. 5.) First, the system initializes the loop counter i=1 (step 802). Next, the system determines whether the loop counter i<N (step 804). If not (NO at step 804), the process is complete. If so (YES at step 804), the system gathers consecutive load values between $gap_{i-1}$ and $gap_i$ (step 806). Next, the system builds a mini-loadshape-projection model to generate load values for gap, based on the gathered load values (step 808). The system then uses the mini-loadshape-projection model to generate load values for $gap_i$ (step 810). Finally, the system uses the generated load values to fill in $gap_i$ (step 812) and increments the loop counter i=i+1 (step 814) before returning to step 804.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for forecasting electricity demand for a utility system, comprising:
receiving a set of load signals from an archive that contains historical load information gathered at various locations throughout an electrical grid, which distributes electrical power for the utility system;
preprocessing the set of load signals by:
applying a first difference function to the set of load signals to produce a set of difference signals,
performing a spike-detection operation on the set of difference signals to identify pairs of positive-negative and negative-positive spikes, which identify gaps in the set of load signals associated with periods of network disruption, and modifying the set of load signals by filling in each identified gap with projected load values determined by performing a localized loadshape forecasting operation based on the continuous load values immediately preceding the identified gap; and forecasting electricity demand for the utility system based on the preprocessed set of load signals, wherein said forecasting comprises:

using a set of input signals, which includes the set of load signals and other input signals, to train an inferential model that learns correlations among the set of input signals;

using the inferential model to produce a set of inferential signals, wherein the inferential model produces an inferential signal for each input signal in the set of input signals;

using a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals; and projecting the set of synthesized signals into the future to produce a forecast for the electricity demand for the utility system.

2. The method of claim 1, wherein the method further comprises using the forecast for the electricity demand to control a supply of electricity provided by the utility system.

3. The method of claim 2, wherein controlling the supply of electricity provided by the utility system comprises one or more of the following:

controlling an amount of electricity produced by one or more power plants in the utility system;

purchasing electricity for the utility system through a power grid;

selling electricity produced by the utility system through the power grid;

storing electricity for future use by the utility system; and making plans to construct a new power plant for the utility system.

4. The method of claim 1, wherein the inferential model is trained using a Multivariate State Estimation Technique (MSET).

5. The method of claim 1, wherein using the Fourier-based decomposition-and-reconstruction technique to generate the set of synthesized signals comprises using a telemetry parameter synthesis (TPSS) technique, which creates a high-fidelity synthesis equation that is used to generate the set of synthesized signals.

6. The method of claim 1, wherein generating the set of synthesized signals comprises: generating a set of un-normalized signals; and performing an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

7. The method of claim 1, wherein: the other input signals include electrical usage data from a set of smart meters, and each smart meter in the set gathers electrical usage data from a customer of the utility system.

8. The method of claim 1, wherein filling in each identified gap with projected load values involves using an optimal-value imputation technique, which replaces missing load values in the set of load signals with imputed load values determined based on correlations between the load signals.

9. A non-transitory computer-readable storage medium storing instructions that when executed by a computer cause the computer to perform a method for forecasting electricity demand for a utility system, the method comprising:

receiving a set of load signals from an archive that contains historical load information gathered at various locations throughout an electrical grid, which distributes electrical power for the utility system;

preprocessing the set of load signals by:

applying a first difference function to the set of load signals to produce a set of difference signals, performing a spike-detection operation on the set of difference signals to identify pairs of positive-negative and negative-positive spikes, which identify gaps in the set of load signals associated with periods of network disruption, and modifying the set of load signals by filling in each identified gap with projected load values determined by performing a localized loadshape forecasting operation based on the continuous load values immediately preceding the identified gap; and forecasting electricity demand for the utility system based on the preprocessed set of load signals, wherein said forecasting comprises:

using a set of input signals, which includes the set of load signals and other input signals, to train an inferential model that learns correlations among the set of input signals;

using the inferential model to produce a set of inferential signals, wherein the inferential model produces an inferential signal for each input signal in the set of input signals;

using a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals; and projecting the set of synthesized signals into the future to produce a forecast for the electricity demand for the utility system.

10. The non-transitory computer-readable storage medium of claim 9, wherein the method further comprises using the forecast for the electricity demand to control a supply of electricity provided by the utility system.

11. The non-transitory computer-readable storage medium of claim 10, wherein controlling the supply of electricity provided by the utility system comprises one or more of the following:

controlling an amount of electricity produced by one or more power plants in the utility system;

purchasing electricity for the utility system through a power grid;

selling electricity produced by the utility system through the power grid;

storing electricity for future use by the utility system; and making plans to construct a new power plant for the utility system.

12. The non-transitory computer-readable storage medium of claim 9, wherein the inferential model is trained using a Multivariate State Estimation Technique (MSET).

13. The non-transitory computer-readable storage medium of claim 9, wherein using the Fourier-based decomposition-and-reconstruction technique to generate the set of synthesized signals comprises using a telemetry parameter synthesis (TPSS) technique, which creates a high-fidelity synthesis equation that is used to generate the set of synthesized signals.

14. The non-transitory computer-readable storage medium of claim 9, wherein generating the set of synthesized signals comprises:
generating a set of un-normalized signals; and
performing an ambient-weather-normalization operation on the set of un-normalized signals to generate the set of synthesized signals, wherein the ambient-weather-normalization operation uses historical, current and predicted weather measurements and historical electrical usage data to adjust the set of un-normalized signals to account for effects of weather on the forecast for electricity demand.

15. The non-transitory computer-readable storage medium of claim 9, wherein:
the other input signals include electrical usage data from a set of smart meters, and
each smart meter in the set gathers electrical usage data from a customer of the utility system.

16. The non-transitory computer-readable storage medium of claim 9, wherein filling in each identified gap with projected load values involves using an optimal-value imputation technique, which replaces missing load values in the set of load signals with imputed load values determined based on correlations between the load signals.

17. A system that forecasts electricity demand for a utility system, comprising:
at least one processor and at least one associated memory; and
a forecasting mechanism that executes on the at least one processor, wherein during operation the forecasting mechanism:
receives a set of load signals from an archive that contains historical load information gathered at various locations throughout an electrical grid, which distributes electrical power for the utility system,
applies a first difference function to the set of load signals to produce a set of difference signals,
performs a spike-detection operation on the set of difference signals to identify pairs of positive-negative and negative-positive spikes, which identify gaps in the set of load signals associated with periods of network disruption,
modifies the set of load signals by filling in each identified gap with projected load values determined by performing a localized loadshape forecasting operation based on the continuous load values immediately preceding the identified gap, and
forecasts electricity demand for the utility system based on the modified set of load signals, wherein said forecasting comprises:
using a set of input signals, which includes the set of load signals and other input signals, to train an inferential model that learns correlations among the set of input signals;
using the inferential model to produce a set of inferential signals, wherein the inferential model produces an inferential signal for each input signal in the set of input signals;
using a Fourier-based decomposition-and-reconstruction technique, which decomposes each signal in the set of inferential signals into deterministic and stochastic components, and uses the deterministic and stochastic components to generate a set of synthesized signals, which are statistically indistinguishable from the inferential signals; and
projecting the set of synthesized signals into the future to produce a forecast for the electricity demand for the utility system.

18. The system of claim 17, wherein the system additionally uses the forecast for the electricity demand to control a supply of electricity provided by the utility system.

19. The system of claim 17, wherein:
the other input signals include electrical usage data from a set of smart meters, and
each smart meter in the set gathers electrical usage data from a customer of the utility system.

20. The system of claim 17, wherein filling in each identified gap with projected load values involves using an optimal-value imputation technique, which replaces missing load values in the set of load signals with imputed load values determined based on correlations between the load signals.

* * * * *

UNITED STATES PATENT AND TRADEMARK OFFICE
CERTIFICATE OF CORRECTION

PATENT NO. : 10,862,302 B1
APPLICATION NO. : 16/458498
DATED : December 8, 2020
INVENTOR(S) : Eyford, III et al.

Page 1 of 1

It is certified that error appears in the above-identified patent and that said Letters Patent is hereby corrected as shown below:

On the Title Page

Item (56), Column 2, under Other Publications, Line 1, delete "Short-Tem" and insert -- Short-Term --, therefor.

In the Specification

In Column 8, Line 31, delete "gap," and insert -- $gap_i$ --, therefor.

In Column 8, Line 32, delete "gap," and insert -- $gap_i$ --, therefor.

In Column 8, Line 36, delete "gap," and insert -- $gap_i$ --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*